W. P. HAMMOND.
COMBINED SPARE TIRE HOLDER AND REAR BUMPER FOR AUTOMOBILES.
APPLICATION FILED APR. 23, 1917.

1,376,807.

Patented May 3, 1921.

Inventor
William P. Hammond

W. P. HAMMOND.
COMBINED SPARE TIRE HOLDER AND REAR BUMPER FOR AUTOMOBILES.
APPLICATION FILED APR. 23, 1917.
1,376,807.
Patented May 3, 1921.
2 SHEETS—SHEET 2.
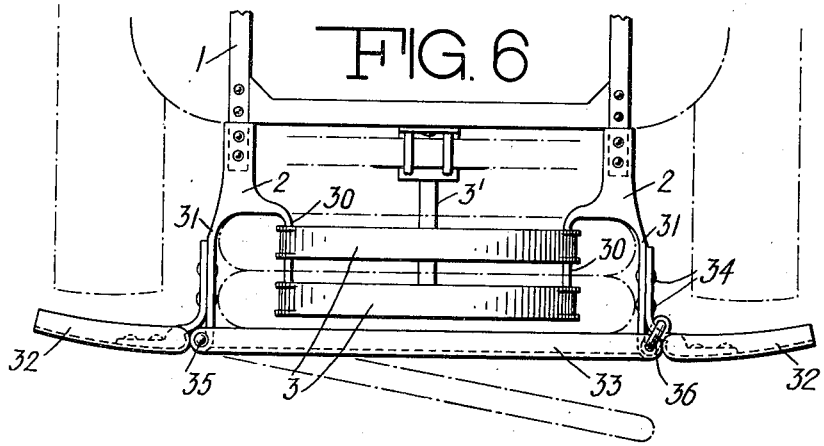
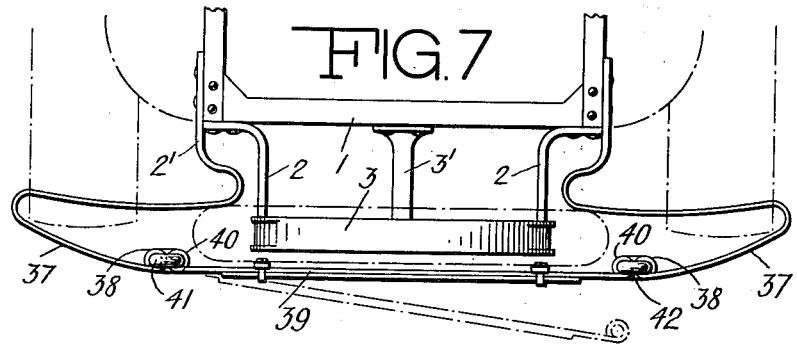
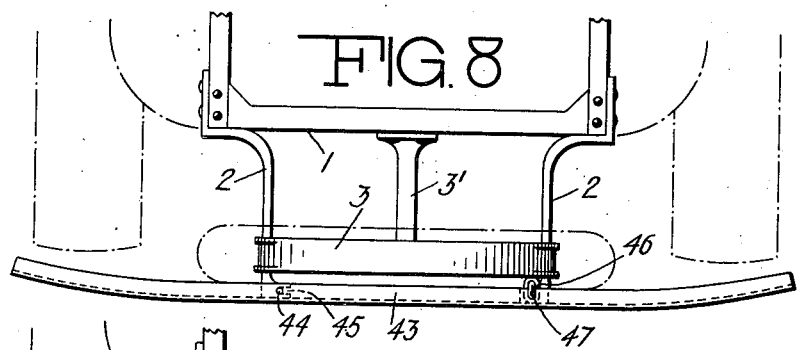
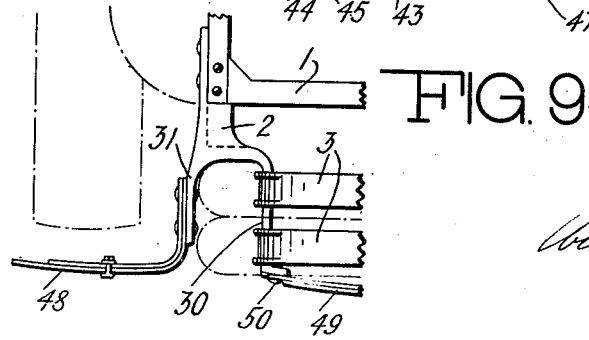
Inventor
William P Hammond

UNITED STATES PATENT OFFICE.

WILLIAM P. HAMMOND, OF PASSAIC, NEW JERSEY.

COMBINED SPARE-TIRE HOLDER AND REAR BUMPER FOR AUTOMOBILES.

1,376,807.        Specification of Letters Patent.        Patented May 3, 1921.

Application filed April 23, 1917. Serial No. 163,828.

*To all whom it may concern:*

Be it known that I, WILLIAM P. HAMMOND, a citizen of the United States, residing in Passaic, county of Passaic, and State of New Jersey, have invented certain new and useful Improvements in Combined Spare-Tire Holders and Rear Bumpers for Automobiles, of which the following is a specification.

My present invention relates to spare tire carriers and rear bumpers for automobiles and the like and has for its object the combining of a tire holder and bumper in a unitary structure, and in one of its embodiments the connection thereof to the frame or chassis of the automobile, so that the weight of the spare tires and strains and shocks due to impacts will be borne by the frame, which can withstand the same to better advantage than the vehicle body to which the brackets for holding spare tires have heretofore been attached.

A further object of my invention is to provide a combined spare tire carrier and bumper at the rear of an automobile in which the transversely arranged bumper is of such construction as will permit of its being folded or moved to a position to allow of the convenient and the ready removal of the spare tire from its support or which will permit the entire disconnection of the bumper or impact receiving portion thereof, to facilitate the dismounting of the spare tire from its bracket support.

A still further object of my invention is to provide a sectional rear-end bumper for automobiles, which, when in operative position, will act in addition as a guard or securing means for the prevention of theft of a spare tire protected thereby, suitable locking means being provided for locking the bumper sections in said operative position.

A still further object of the invention is to provide independent fender or bumper members at the rear of the side members of the automobile chassis extending rearwardly and laterally thereof in position to protect the automobile fenders.

To the accomplishment of these, as well as other objects, which will manifest themselves from a reading of the following specification, I have illustrated in the accompanying drawings several preferable structures embodying the principles of my invention, in which—

Figs. 6, 7, 8 and 9 illustrate in a similar manner still further modifications of the invention.

Referring to Figs. 1 to 5, inclusive, the combined tire carrier and bumper is preferably fastened to the automobile chassis 1, by means of bracket arms 2. To these arms are fastened suitable tire carrying devices 3, shown here in the form of somewhat circular holders which are adapted to receive and hold the rims of the inflated spare tires. Mounted upon these holders or at the extremities of the arms carrying the same are the bumper sections 4 and 5, these being arranged to guard the rear fenders and gasolene tank as well as to protect the spare tires. The bumper sections are arranged to be moved longitudinally of the car so as to permit of the spare tires being removed from the holders with the least effort and as expeditiously as possible. This feature of the invention is of considerable importance when tires of large size are used which are extremely heavy and which would have to be lifted upwardly and then outwardly when dismounting to clear the top of a fixed bumper should the same be used. Making the bumper in sections and mounting those sections to swing into substantially parallel relation with each other, enables the convenient dismounting of the spare tire. At the same time the arrangement possesses the further advantage of permitting compact assembly; that is to say—it enables the bumper, when in operative position, to be brought nearer the parts which it is designed to protect, particularly the tires, as no substantial clearance need be allowed between them.

Figure 1:
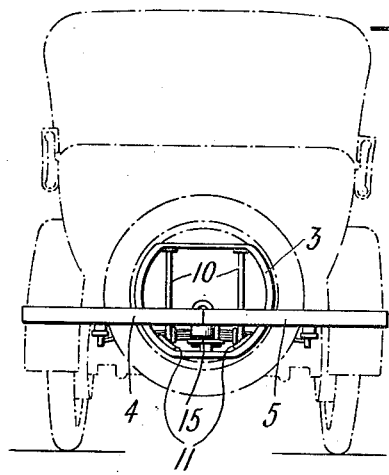
Figure 1 is a rear view of an automobile, showing the application thereto of one form of combined spare tire carrier and bumper made in accordance with my invention.
Figure 2:
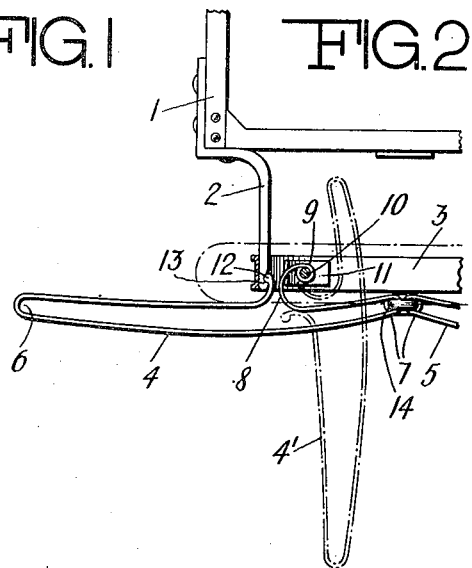
Fig. 2 illustrates in top plan a fragmentary portion of an automobile chassis attached to which is the combined spare tire carrier and bumper illustrated in Fig. 1, parts being broken away and in section, so as to illustrate the novel features thereof.

The bumper sections 4 and 5 illustrated in that form of the device shown in Figs. 1 and 2 are made from strips of flat spring metal, the extremities or ends being reversed upon themselves to form loops 6 and 7. One end is curved at 8 and terminates in an eye 9, which forms a pivot around a bar 10, the ends of the latter being fastened and held by plates 11 fast to the holder 3. The other extremity of the bumper section terminates in a beaded end portion 12, which is detachably connected with the arm 2, which is socketed at 13 to receive the same. Connecting the inner loops when the bumper sections are in their normal operative position, is the bow portion 14 of a padlock 15. It will be observed from the foregoing described construction that the impact receiving portions of the bumper sections are resilient and each section will give should a bump occur, the strain and stresses of the shock being transmitted through the holder 2 and arms 3 to the chassis of the automobile.

When occasion arises to remove the spare tire from the holder 3, the padlock 15 is removed thus releasing the sections so that they can be swung around until both assume a position longitudinally of the car, as shown in dotted outline at 4'. In order to accomplish this movement, pressure is exerted on the inner arms of the bumper sections to dislodge their ends 12 from the sockets 13, whereupon the sections can be turned on their pivots 10 in a manner thought to be well understood.

Figure 3:
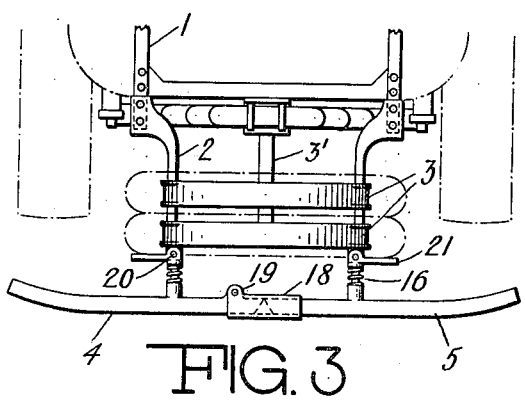
Fig. 3 is a view in top plan of a modification of my invention showing it applied to the rear of an automobile, part only of the latter being shown.
Figure 4:
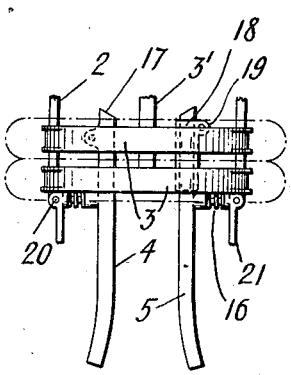
Fig. 4 is a similar view of a fragmentary portion of the combined tire carrier and bumper shown in Fig. 3, the bumper sections being moved to inoperative positions so as to permit the removal of the tires from their holders.

In the modifications shown in Figs. 3 and 4, the bumper sections 4 and 5 are in the form of bars resiliently held at 16 at the extremities of the arms 2. The bumper sections here are chamfered or cut away at 17, so as to permit of their clearing one another when moved to the position shown in Fig. 4. In order to connect the bumper sections, a sleeve 18 is employed which is in sliding contact therewith, the same being designed to overlap the inner extremities of the bars as shown in Fig. 3. This sleeve 18 is provided with a perforated ear or extension 19, which alines with a similar perforated extension on the section 4 of the bumper and these perforations are designed to receive the bow of a padlock, which will serve to hold the sections in operative position and also prevent the unauthorized removal of a spare tire. The arm extensions which connect the bumper sections with the arms 2 are pivotally mounted at 20, so that these sections can be swung into the parallel position shown in Fig. 4 to permit of the removal of the tires. At the pivotal points 20 are arranged short arm extensions 21, which may be useful in assisting to hold the spare tires in their proper carrying position.

Figure 5:
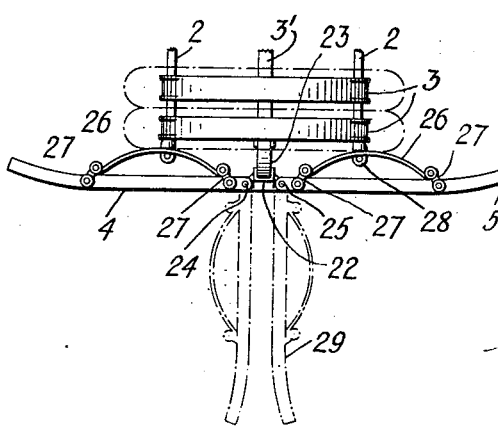
Fig. 5 is a view in top plan of another modification of the invention.

In the modification shown in Fig. 5, the bumper sections are pivoted to a bracket 22 held at the extremity of the resilient supporting member 23, which is connected with the holder 3 and extends therefrom, 24 and 25 indicating the points of pivotal connection for said sections. A pair of bow springs 26 are fastened to the bumper sections at 27 and when the bumper sections are in their operative position, these bow springs rest against shoulders provided at the extremities of the arms 2. These extremities are also provided with perforated extensions 28 adapted to receive a locking pin or padlock which will prevent the bumper sections from being swung into their inoperative position, thus effecting a lock which will prevent the unauthorized removal of the spare tires. Upon the removal of the locking means, the bumper sections can be moved to the position shown in dotted outline at 29, much in the same manner and to effect the same results as heretofore described in connection with the other forms of the invention.

Referring to the modification shown in Fig. 6, the arms 2 are forked to provide supports 30 for the tire holders 3 and the bumper supports 31. The bumper in this instance consists of three sections, two outer sections 32, which guard the fenders of the automobile and a central section 33. The outer sections are permanently located and are made fast to the arms 31 at 34 and the central section 33 is pivoted to the extremity of the arm 31 at 35. The other extremity of this section is provided with an eye through which the bow 36 of the padlock may extend, said bow being of sufficient size to receive the adjacent portion of the arm which holds the section 32, so as to lock the same in protective position. When it is desired to remove the spare tires, the padlock 36 is taken off and the section 33 is swung around the pivot 35, thus allowing access being readily had to the spare tires, which may then be removed from their holders 3.

In the modification illustrated in Fig. 7, the spare tire holder 3 is mounted upon arms 2, which are independent of the arms which support the bumper sections indicated at 2'. In this instance, the outer bumper sections are in the form of spring loops 37, terminating in the eyes 38, while the central section 39 is of a laminated construction, the extremities of the inner laminations terminating in eyes 40. These sections are held together by U-bolts 41 and 42, and it is upon the removal of the U-bolt 41 that the center section is permitted to be swung around that leg of the U-bolt which forms a pivot therefor through the eye 40, thus permitting the removal of the spare tire.

In the modification shown in Fig. 8, the bumper is of one-piece construction and is disconnectedly held in operative position at the extremities of the arms 2. The bumper here indicated at 43 is made of channel iron and is provided with a pin 44 adapted to be received within the slot 45 of the laterally extending end of the arm 2, this being of reduced cross section, so as to fit within the channel of the bumper. The other arm 2 is provided with a perforated ear 46 and in alinement with the perforation of this ear is a perforation through the bumper, so that a U-bolt 47 or the bow of a padlock may be received through said perforations constituting locking means therefor. To remove this bumper, the padlock or U-bolt 47 is first removed and the bumper is then moved in a lateral direction to disengage the pin 44 from the slot 45 in the extension of the arm 2. The spare tire can then be readily removed from its holder.

In referring to Fig. 9, I provide guard members for the fenders in the form of short laminated springs 48. These serve principally to prevent what are known as side swipes from bending, denting or smashing the fenders. In this construction, I may, if desired, use U-shaped arms similar to those heretofore described in connection with the illustration shown in Fig. 6 and should I desire to guard the spare tires or license tag and tail lights, which are commonly positioned within the tire holders, I may provide a laminated spring guard 49 fastened at 50 to the extremities of the arms which support the tire holders.

In the constructions illustrated in Figs. 3 to 8, inclusive, additional supporting arms 3' may be provided for adding additional rigidity to the constructions as a whole.

From the foregoing, it will be observed that the combined tire and bumper bracket support is preferably held in its operative position by the frame of the automobile chassis and not by any portion of the vehicle body. By a construction of this kind, a very rigid and adequate support for the spare tires is provided. At the same time, any shocks due to impacts received by the bumper are transmitted to that portion of the vehicle which can easily withstand them. While I preferably support the bracket by the chassis, my invention is in no way limited thereto as in some instances it may be found desirable owing to vehicle construction to mount the tire and bumper bracket upon the body of the automobile itself. I, therefore, desire it to be understood that I wish to cover the above-described novel principles broadly in whatever embodiment and in whatever way used.

Of course, variations in structural details may be resorted to without departing from the spirit and scope of my invention and I reserve unto myself that range of equivalency to which I am entitled.

What I claim is:

1. A spare tire support, and impact receiving means normally preventing the removal of a spare tire from said support, said impact receiving means being movable from its operative position to permit of the removal of a spare tire.

2. A spare tire support, and impact receiving means extending transversely of said support intermediate the upper and lower portions thereof, whereby removal of a spare tire from said support by direct outward movement is prevented, said impact receiving means being movable from its operative position to permit of the removal of the spare tire by direct outward movement.

3. A spare tire support, and impact receiving means adapted releasably to hold a spare tire in position upon said support.

4. A spare tire support, and impact receiving means adapted normally to prevent the removal of a spare tire from said support, said impact receiving means being pivotally supported whereby the same may be moved to permit the removal of the spare tire.

5. A spare tire support, and impact receiving means adapted normally to prevent the removal of a spare tire from said support, said impact receiving means being pivotally supported whereby the same may be moved to permit the removal of the spare tire, and means for locking said impact receiving means in normal position.

6. In apparatus of the character described, supporting means adapted to be connected to the rear of an automobile and to extend rearwardly therefrom, a spare tire support operably connected to said supporting means, and impact receiving means operably connected to said supporting means in rear of said spare tire support and normally in register therewith whereby to prevent the removal therefrom of a spare tire, said impact receiving means being movable from its normal position to permit of the removal of the spare tire from said support.

7. In apparatus of the character described, supporting means adapted to be connected to the rear of an automobile and to extend rearwardly therefrom, a spare tire support operably connected to said supporting means, and impact receiving means operably connected to said supporting means in rear of said spare tire support and normally in register therewith whereby to prevent the removal therefrom of a spare tire, said impact receiving means being rotatable from its normal position to permit of the removal of the spare tire from said support.

8. In apparatus of the character described, supporting means adapted to be connected to the rear of an automobile and to extend rearwardly therefrom, a spare tire support operably connected to said supporting means, impact receiving means operably connected to said supporting means in rear of said spare tire support and normally in register therewith whereby to prevent the removal therefrom of a spare tire, said impact receiving means being movable from its normal position to permit of the removal of the spare tire from said support, and means for locking said impact receiving means in normal position.

9. In apparatus of the character described, supporting brackets adapted to be connected to the rear of an automobile and to extend rearwardly therefrom, a spare tire support operably connected to said brackets, and rotatable impact receiving means operably connected to said brackets in rear of said spare tire support and normally in register therewith whereby to prevent the removal therefrom of a spare tire, said impact receiving means being rotatable from its normal position to permit of the removal of the spare tire from said support.

10. A spare tire support and a bumper comprising swinging sections normally positioned to prevent the removal of a spare tire from said support and adapted to be swung out of their normal positions to permit of the removal of the spare tire.

11. A spare tire support and a bumper comprising swinging sections normally positioned to prevent the removal of a spare tire from said support and adapted to be swung out of their normal positions to permit of the removal of the spare tire, and means for holding said sections in their normal positions.

WILLIAM P. HAMMOND.